United States Patent [19]

Guarneri

[11] Patent Number: 4,915,966

[45] Date of Patent: Apr. 10, 1990

[54] METHOD OF MAKING DRIED PASTA PRODUCTS

[75] Inventor: Roberto Guarneri, Parma, Italy

[73] Assignee: Barilla G. E R. F.LLI - Societa' Per Azioni, Parma, Italy

[21] Appl. No.: 286,025

[22] Filed: Dec. 19, 1988

[30] Foreign Application Priority Data

Dec. 18, 1987 [IT] Italy ................................ 23095 A/87

[51] Int. Cl.$^4$ ................................................ A23L 1/16
[52] U.S. Cl. ...................................... 426/451; 426/557
[58] Field of Search ................. 426/451, 458, 467, 557

[56] References Cited

U.S. PATENT DOCUMENTS 4,483,879 11/1984 Sugisawa et al. .................... 426/557
4,529,609  7/1985 Gaehring et al. .................... 426/557

FOREIGN PATENT DOCUMENTS 59-173059 9/1984 Japan .
 2178292 1/1987 United Kingdom .

OTHER PUBLICATIONS

"Water Activity in the Pasta Products Drying Process", by Raffaele Paraventi, Tecnica Molitoria, Issue 9, Sep. 1984 (with translation).
Abstract of Japanese Appl. 84-95854.

Primary Examiner—George Yeung
Attorney, Agent, or Firm—Sughrue, Mion, Zinn, Macpeak & Seas

[57] ABSTRACT

A method of making dried pasta products from freshly prepared pasta having a relative moisture content of about 32% by weight comprises a drying process which is carried out by successive isothermal applications of heat at progressively higher temperatures with the range of 40° to 110° C. while controlling the Aw of the pasta at values below 0.86.

In this way, the pasta overall drying time is significantly shortened while keeping its organoleptic properties unaltered.

4 Claims, 1 Drawing Sheet

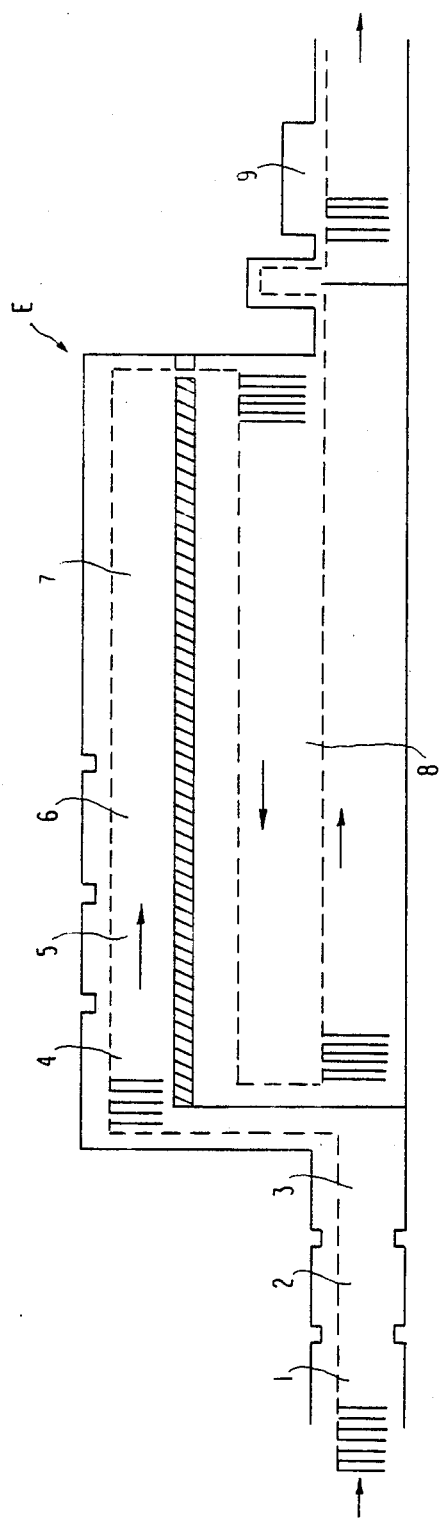

METHOD OF MAKING DRIED PASTA PRODUCTS

DESCRIPTION

This invention relates to a method of making dried "pasta" products.

Throughout this specification and the appended claims, the term "dried pasta product(s)" will be used to define pasta products having a relative moisture content within the range of 10% to 13% by weight.

A pasta product making process is generally known to begin with the preparation of dough from flour and water which, for convenient handling and good workability through the pertinent machinery, should have a moisture content in the 30% to 32% by-weight range, which value is subsequently brought down the sought value of 10% to 13% by weight following a suitable drying process.

It is a well-recognized fact that the organoleptic and nutritive characteristics of a dried pasta product, as well as its firmness on cooking, are tied to the conditions under which the drying process is carried out; these being decisive factors in assessing the commercial value of the end product.

In the pertinent art, the above-mentioned property of firmness on cooking is generally related to a parameter referred to as "cooking value". This parameter is a measure of the texture or consistency and the organoleptic characteristics of a pasta product after cooking. In this respect, a pasta product is expected to offer good resistance to chewing (i.e. not to become stuck to the teeth) as is typical of so-called "al dente" (underdone) pasta, to "bounce" and set loosely in the plate, and form no sticky coating on its surface.

A second problem which associates with the conditions under which a freshly prepared pasta product is dried originates from thermal downgrading of its nutritive properties (in particular of the essential aminoacids), the extent of which downgrading is recognized to depend on the drying process temperature and duration.

In accordance with procedures long adopted in the pertinent art, the pasta drying process to yield dried pasta products is conducted at a low temperature throughout, within a range of values from 40° to *60° C. In this way, a dried pasta product has been obtained which, while retaining its organoleptic and nutritive qualities virtually unaltered, has a low cooking value affecting in a definitely adverse manner its commercial worth.

Such a drying method involves, moreover, a long process time on the order of 16 to 24 hours, which brings about the well-recognized drawback of requiring drier apparatus of considerable and presently unacceptable length, with their attendant operating problems and inefficient use of power.

In an attempt at obviating the latter drawback, a drying method at very high temperatures, on the order of 120° to 140° C., has been proposed and utilized.

Such a process condition, while shortening the drying time and allowing for smaller size drier apparatus, fails to fully safeguard the nutritive and organoleptic properties of the pasta product, because exposure to high temperatures significantly lowers them resulting, in particular, in the essential aminoacids undergoing thermal damage.

In addition, the thermal shock to which the pasta product is subjected is bound to alter the structure and porosity of the dried end product, detracting from its mechanical strength and firmness on cooking.

The problem which underlies this invention is to provide a method of making dried pasta products wherein the drying step enables the organoleptic and nutritive properties of freshly prepared pasta to be kept substantially unaltered, while lowering the method implementation times.

This problem is solved according to the invention by the method being characterized in that it comprises drying freshly prepared pasta stepwise by isothermal application of heat at gradually higher temperatures within the range of 40° to 110° C., said stepwise pasta drying taking place with the pasta Aw controlled to drop no lower than 0.86.

The term "Aw" indicates the ratio of the vapor pressure of the water within the pasta to the vapor pressure of pure water in the same conditions of pressure and temperature.

The method of this invention advantageously affords shorter drying times for the freshly prepared pasta while retaining virtually unaltered the nutritive properties of the starting ingredients. It has, in fact, been surprisingly and advantageously found that thermal damage to the essential aminoacids can be drastically reduced in this way.

Further advantages and features of the method according to the invention will become apparent from the following detailed description of a preferred, though not exclusive, embodiment thereof, to be taken by way of example and not of limitation in conjunction with the accompanying drawing, which shows in diagramatic form a drier apparatus for implementing the inventive method.

With reference to the drawing, the character E designates comprehensively a conventional drier of the tunnel type, with successive areas of which where the step succession of the method according to the invention are carried out brought out.

EXAMPLE 100 kg spaghettis prepared from 80 kg durum wheat flour, and 20 kg water, having a length of 60 cm and a moisture content of 32%, was introduced into and allowed to reside for about 5 minutes in the area 1 of the drier E, as maintained at a temperature of 40° C. and relative humidity of 50% by forced circulation of hot damp air therethrough. During this step of isothermal heat application, the temperature of the spaghettis reached a constant value of approximately 30° C. and their relative humidity dropped from 32% down to 30% by weight.

The spaghettis were then moved into and allowed to reside for approximately 5 minutes in the areas 2 and 3 of the drier, as maintained at 50° C. and 60° C., respectively, with the relative humidity of the hot air in the 50% range.

As a result of this isothermal heating, the relative humidity decreased to 28% (in the area 2) and to about 24% (in the area 3) while their temperatures achieved values of 42° C. and 50° C., respectively.

During these intial stages of the stepwise drying process, the moisture still present in the pasta (spaghettis) was sufficient to keep the outer surface thereof saturated with water. Under such conditions, the value of Aw remained constant at about 1. During the following drying steps, for each additional decrease in the pasta (spaghettis) relative humidity there occurred a corresponding decrease in the Aw parameter.

The spaghettis were then moved into the area 4 of the drier E, and held therein at a temperature of about 70° C. for another 5 minutes, while still using hot air at 50% relative humidity. During this isothermal heating step, the pasta relative humidity dropped to about 22% whilst its temperature settled at a constant value of 62% and the value of Aw dropped to about 0.95.

Note should be taken of that the isothermal application of heat to the pasta (spaghettis) was effected at gradually higher temperatures under the conditions specified herein below, with Aw controlled to stay above a value of 0.86.

By avoiding any further decrease in the value of the Aw parameter, in fact, an advantageous reduction in the essential aminoacid thermal damage was observed.

The spaghettis were next conveyed into and allowed to reside for 20 minutes in the area 5 of the drier E, as maintained at a constant temperature of 80° C., using hot air at 70% humidity. With this isothermal heating, the relative humidity of the spaghettis dropped to about 18% whilst their temperature achieved a value of 76° C.

The Aw parameter, which under the new temperature conditions in the drier area 5 had initially raised to about 0.98, decreased then gradually as the water was taken away from the spaghettis down to a value of 0.92.

Thereafter, the spaghettis were allowed to reside in the area 6, as maintained at a temperature of about 84° C. with hot air at 70% relative humidity, to achieve a corresponding decrease of their relative humidity down to 16%. Their temperature reached 78° C. at this stage.

In a similar manner to what took place in the area 5, the value of Aw was raised initially to 0.94 to then decrease gradually to 0.90 as the spaghetti drying progresses.

The spaghettis were subsequently transferred into an area 7 of the drier as held at a temperature of 94° C., while still using hot air at 80% relative humidity. In this area, the spaghettis were subjected to a final drying step for an overall time period of about 30 minutes, during which step the pasta relative humidity dropped to 12.5% by weight while Aw dropped to 0.86.

The spaghettis, as taken to the area 8 of the drier E, were subjected to a thermal stabilization process lasting approximately 90 minutes, using air at a temperature of 70° C. and 78% relative humidity.

With that thermal stabilization, the relative humidity and Aw of the pasta were held constant (at 12.5% and 0.86, respectively), and even distribution of the moisture content was achieved to impart the end product with improved porosity and mechanical strength characteristics.

Improved were also the sanitary and bacteriological characteristics (bacterial flora clearing actions) as well as the outward appearance of the pasta product (an amber-hued yellow), without downgrading the organoleptic characteristics and nutritive properties of the pasta product.

On completion of the thermal stabilization process, the spaghettis were cooled to 25° C. in the area 9 of the drier E.

The drier E delivered at its output end 77.7 kg spaghettis which were then transferred to for further processing.

TABLE

| Area in the drier (No.) | Air temperature (°C.) | Air relative humidity (%) | Time (min.) | Relative humidity of of output pasta (%) | Pasta temperature (°C.) | Aw of input pasta | Aw of output pasta |
|---|---|---|---|---|---|---|---|
| 1 | 40 | 50 | 5 | 30 | 30 | 1.00 | 1.00 |
| 2 | 50 | 50 | 5 | 28 | 42 | 1.00 | 1.00 |
| 3 | 60 | 50 | 5 | 24 | 50 | 1.00 | 1.00 |
| 4 | 70 | 50 | 5 | 22 | 62 | 1.00 | 0,95 |
| 5 | 80 | 70 | 20 | 18 | 76 | 0,98 | 0,92 |
| 6 | 84 | 70 | 20 | 16 | 78 | 0,94 | 0,90 |
| 7 | 94 | 80 | 30 | 12,5 | 90 | 0,92 | 0,86 |
| 8 | 70 | 78 | 90 | 12,5 | 70 | 0,86 | 0,86 |

Understandably, the number of the steps of isothermal heat application actually carried out in the Example has purely illustrative purposes and may be varied as long as the Aw parameter is controlled to values equal to or higher than 0.86, while at the same time having the moisture content of the pasta product reduced to the characteristic value of 12.5%.

The reduction in moisture content of the freshly prepared pasta, as afforded by the method according to the invention, is conveniently and advantageously achieved in a gradual manner, by successive isothermal applications of heat to be effected at progressively higher temperature levels as the residual humidity decreases. In this way, a dried pasta product is obtained which, additionally to having a high cooking value, exhibits optimum porosity and mechanical strength characteristics due to the final step of thermal stabilization.

A not least advantage is that the method of this invention enables the drying of freshly prepared pasta to be accomplished in a short time (three hours in the Example given), which results in a drastic reduction of the drier apparatus size. The net result of all this is obviously the added advantage of a marked improvement in the drier throughput and significant power savings.

I claim:

1. A method of making dried pasta products, which comprises drying freshly prepared pasta stepwise by isothermal application of heat at gradually higher temperatures within the range of from 40° to 110° C., said stepwise pasta drying taking place with the pasta Aw controlled to drop no lower than 0.86.

2. A method according to claim 1, wherein the application of heat is effected by means of streams of hot air at a relative humidity of from 50% to 80%.

3. A method according to claim 1, further comprising, after said stepwise pasta drying, a step of thermal stabilization carried out at temperatures in the 60° to 80° C. range and at about 80% relative humidity of the hot air.

4. A method according to claim 3, wherein said thermal stabilization step is carried out by means of hot air at a temperature of about 70° C. over a time period of no less then 90 minutes.

* * * * *